US005708462A

United States Patent [19]

Helmbold et al.

[11] Patent Number: 5,708,462

[45] Date of Patent: Jan. 13, 1998

[54] MICROPROCESSOR CONTROLLED THERMAL PRINTER

[75] Inventors: James E. Helmbold, Centerville; Donald A. Morrison, Dayton; Rex D. Watkins, Franklin; Richard D. Wirrig, Centerville, all of Ohio

[73] Assignee: Monarch Marking Systems, Inc., Dayton, Ohio

[21] Appl. No.: 348,604

[22] Filed: Dec. 2, 1994

Related U.S. Application Data

[63] Continuation-in-part of Ser. No. 257,463, Jun. 8, 1994, abandoned, which is a continuation of Ser. No. 724,609, Jul. 2, 1991, abandoned, which is a continuation of Ser. No. 234,364, Aug. 19, 1988, Pat. No. 5,061,946, which is a continuation-in-part of Ser. No. 209,946, Jun. 22, 1988, Pat. No. 5,061,947.

[51] Int. Cl.[6] .......... G01D 15/24

[52] U.S. Cl. .......... 346/136

[58] Field of Search .......... 346/136; 101/66; 400/630, 633, 88, 708, 68; 347/109; 226/24, 27, 32, 43, 45

[56] References Cited

U.S. PATENT DOCUMENTS 5,061,946 10/1991 Helmbold et al. .......... 346/136

*Primary Examiner*—Benjamin R. Fuller

*Assistant Examiner*—Judy Nguyen

*Attorney, Agent, or Firm*—McAndrews, Held & Malloy, Ltd.

[57] ABSTRACT

A microprocessor controlled thermal printer particularly usable in a hand-held labeler for printing labels on a composite web detects indices on the web and utilizes the detected indices to position the labels relative to the print head. The printer utilizes an improved index detection system that compensates for variations in index size and density and for variations in sensor sensitivity by detecting both the leading and trailing edges of an index and utilizing the distance between the detected leading and trailing edges to determine the length of the index. By dividing the length thus determined by two, and by advancing the web by this amount after the detection of the leading edge of an index, the center of the index can be accurately located, and the web can be accurately registered at any desired position relative to the center of the index.

14 Claims, 13 Drawing Sheets

FIG. 1
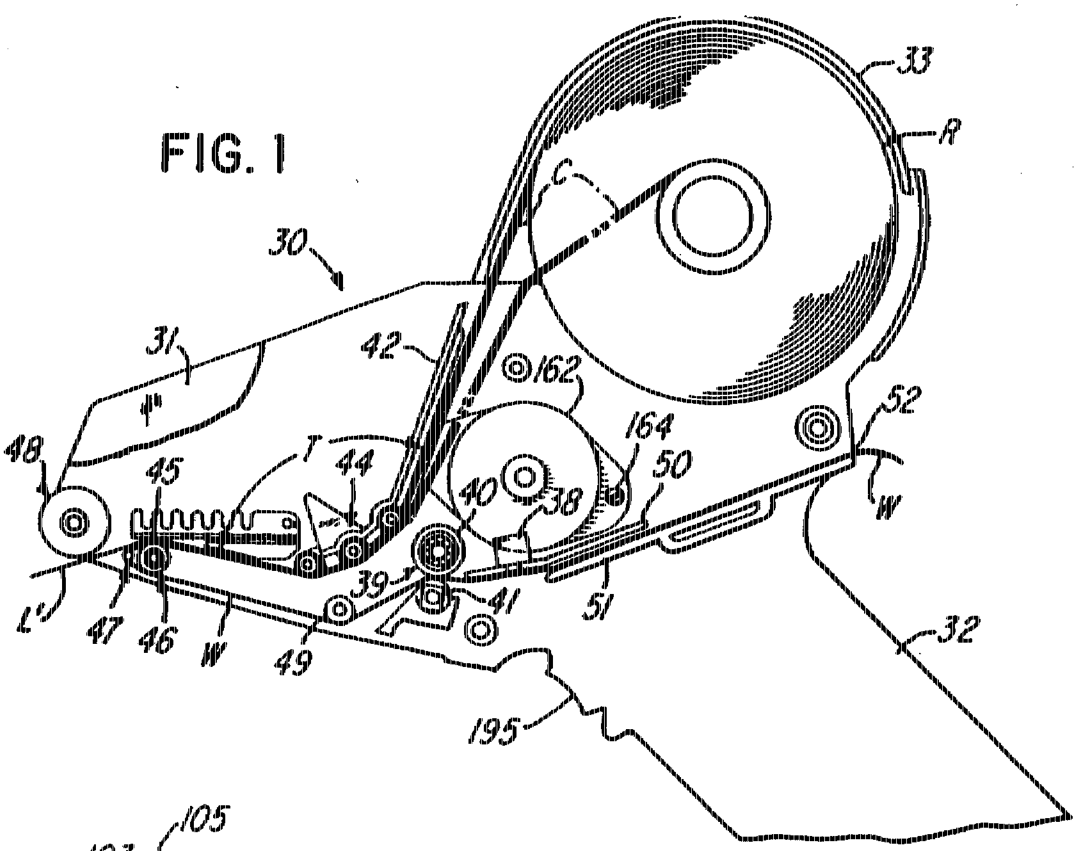
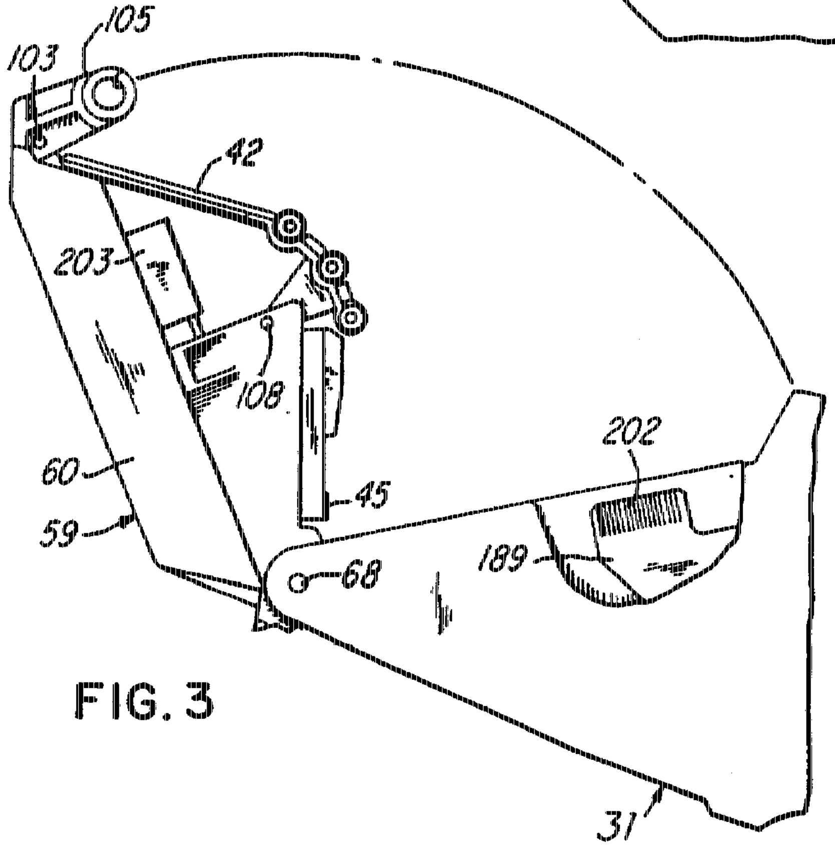
FIG. 3

MICROPROCESSOR CONTROLLED THERMAL PRINTER

CROSS REFERENCE TO RELATED APPLICATIONS

This is a continuation-in-part of application Ser. No. 08/257,463 filed Jun. 8, 1994 which is a continuation of application Ser. No. 07/724,609 filed Jul. 2, 1991, both now abandoned which is a continuation of application Ser. No. 07/234,364 filed Aug. 19, 1988, now Issued U.S. Pat. No. 5,061,946 which is a continuation-in-part of application Ser. No. 07/209,946 filed Jun. 22, 1988 which issued into U.S. Pat. No. 5,061,947.

BACKGROUND OF THE INVENTION

This invention relates generally to printers, and more particularly to a printer usable in a hand-held labeler for controlling a thermal print head for printing characters of various fonts and formats on a composite web.

Various printers are known, and examples of such printers are disclosed in U.S. Pat. No. 4,264,396 granted to Donald S. Stewart on Apr. 28, 1981; U.S. Pat. No. 4,442,774 granted to Frederick M. Pou et al. on Apr. 17, 1984; U.S. Pat. No. 4,556,442 granted to Daniel J. Torbeck on Dec. 3, 1985; U.S. Pat. No. 4,578,138 granted to Paul H. Hamisch Jr. et al. on Mar. 25, 1986; U.S. Pat. No. 4,584,047 granted to James L. Vanderpool et al. on Apr. 22, 1986; and U.S. Pat. No. 4,603,629 granted to Frederick M. Pou on Aug. 5, 1986.

SUMMARY OF THE INVENTION

This invention relates to an improved printer which is particularly suitable for use in a handheld labeler utilizing a thermal print head to print characters in various fonts and formats onto variable length labels disposed on a composite web.

The printer utilizes an improved detection system for detecting index marks that have a predetermined measurable length disposed at regular intervals along the length of the composite web. The detection system compensates for variations in the size of the index marks and for variations in the sensitivity of the sensor. The compensation is provided by sensing the leading and trailing edges of an index mark and determining the distance between the leading and trailing edges to determine the apparent length of the index as sensed by the sensor. The length thus obtained is divided by two, thus permitting the center of the mark relative to the leading edge to be determined.

These and other objects, advantages and novel features of the present invention, as well as details of an illustrated embodiment thereof, will be more fully understood from the following description and the drawing.

BRIEF DESCRIPTION OF THE DRAWING

FIG. 1 is a diagrammatic side elevational view of a printer in the form of a hand-held labeler in accordance with an embodiment of the present invention;

FIG. 3 is a side elevational view of the front of the labeler of FIG. 1 showing the front in the open position;

DESCRIPTION OF THE PREFERRED EMBODIMENT

A printer employing the present invention is shown in FIG. 1 as a hand-held labeler generally indicated at 30. Although the present invention is described herein for the labeler 30, it is applicable to other types of printers that print characters in various fonts and formats onto a web of record members such as a table top printer that prints tags or the like, as shown in the aforementioned U.S. Pat. No. 4,442,774, incorporated herein by reference.

Figure 5:
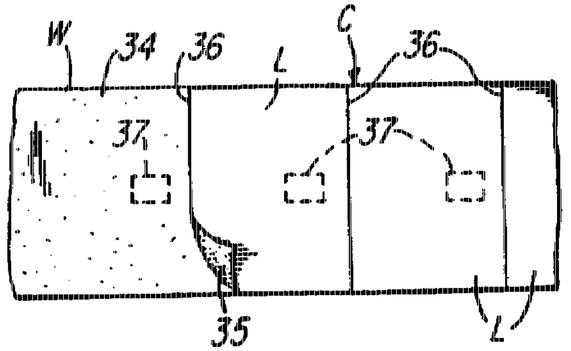
FIG. 5 is a top plan view showing a fragmentary portion of the composite label web.

The labeler 30 as shown in FIG. 1 includes a frame or housing 31 having a handle 32. The housing 31 suitably mounts a label supply roll R. The roll R is shielded from ambient conditions, such as dust by a cover 33. The roll R is comprised of a composite label web C shown in both solid lines representing a full roll R, and phantom lines representing a nearly fully depleted roll R. The composite web C includes a carrier web W having a coating of release material such as silicone wherein the labels, such as a-label L' which is one of a plurality of labels L-(FIG. 5), are releasably secured to the carrier web W by a pressure sensitive adhesive. Solid, rectangular marks may be provided on the underside of the carrier web W for sensing by an optical sensor 38 in order to control various labeler functions and operations.

The composite label web C is paid out of the roll R when an advancing or feeding mechanism generally indicated at 39 is operated. The feeding mechanism 39 includes a resilient driving roll 40 and a cooperating serrated metal idler roll 41, wherein the driving roll 40 is coupled to and driven by an electric motor 162. The composite web C passes from the roll R to between a pair of spaced guides, only one of which is shown at 42. From there the composite web C makes a gradual transition as it passes about the guide 42. The guides 42 and a guide 44 define a path for the composite web C between the place where the composite web C is paid out of the roll R on the one hand, and a print head 45 and a cooperating platen generally indicated at 46 on the other hand. The print head 45 has a straight line of closely spaced print elements, preferably thermal print elements, which extends perpendicular to the path of travel of the composite web C. The transition made by the composite web C is through an angle T not less than 850 and preferably about 960 assuming a full label supply roll R, and in addition, it is preferred that the radius RI of the path be not less than 18 mm and most preferably about 25 mm. A delaminator generally indicated at 47 includes a peel roller positioned closely adjacent the line of pressure contact between the print head 45 and the platen 46. The carrier web w passes partly about the delaminator 47 to effect delamination of the leading label L'. The leading label LI is dispensed into label applying relationship with respect to an applicator generally indicated at 48. From the delaminator 47 the carrier web W passes again into contact with the platen 46, and from there, partly about a guide roller 49 to between the neck of the rolls 40 and 41. The carrier web W has enough stiffness to be pushed along guides 50, 51 and 51' and to exit through an exit opening 52 in the housing 31 at a point above and behind the handle 32.

Figure 2:
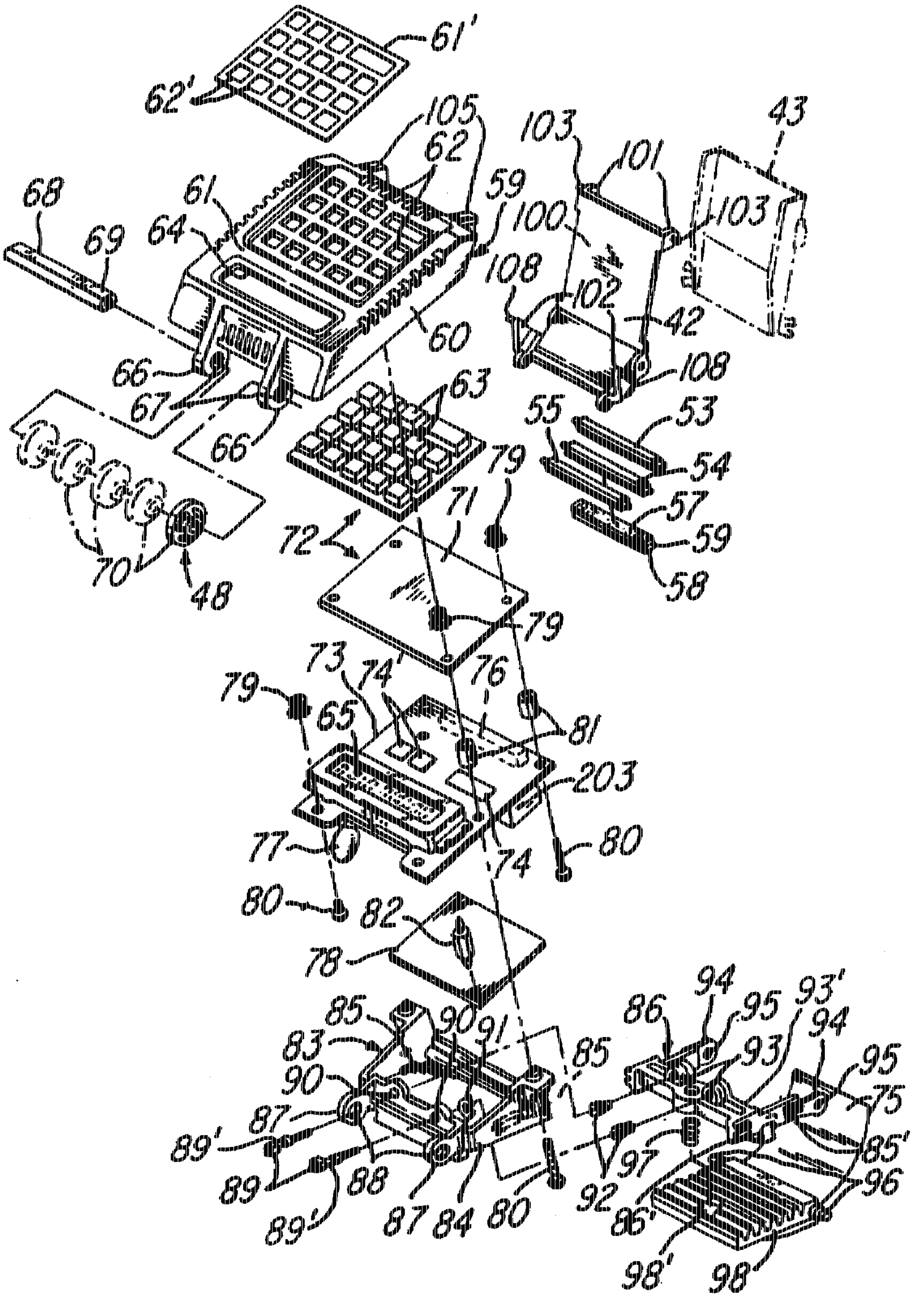
FIG. 2 is an exploded perspective view of one section of the hand-held labeler of FIG. 1.

With reference to FIG. 2, there is shown a section generally indicated at 59 for mounting various components of the labeler 30. The section 59 helps to protect such components from damage and ambient contamination and can be considered to constitute an outer part of the housing 31, if desired. The section 59 is shown to include a generally box-like member 60 having a wall portion 61 with openings 62. Keypads 63 project through the openings 62, and an opening 64 receives a display 65. A grid-like sheet 61' has holes 62' aligned with the holes 62. The holes 61' receive the keypads 63. Different areas of the sheet 61' are color coded to avoid the need for color-coding the keypads 63. The member 60 has a pair of spaced tabs 66 with aligned holes 67 for receiving a shaft 68 having flats 69. The flats 69 key the shaft 68 to the housing 31 against rotation. The shaft 68 passes through a series of rotatable applicator rollers 70 which comprise the applicator 48. The section 59 can pivot about the shaft 68 between its normally closed or operative position to its open position.

The keypads 63 and a cooperating printed circuit board 71 constitute a keyboard generally indicated at 72. Another circuit board 73 mounts the display 65, a microprocessor 74 and various other electrical components 74' which are diagrammatically illustrated. The print head 45 is connected by a ribbon connector 75 to a plug-in type connector 76 which, in turn, is connected to the microprocessor 74'. The printed circuit board 73 also mounts an auxiliary lithium battery 77 for powering the microprocessor 74 when other power to the microprocessor 74 is interrupted. Additional memory is contained in a printed circuit board 78. The printed circuit boards 71 and 73 are secured to the section 59 by fasteners 79 secured to the inside of the section 59 by screws 80 received by the fasteners 79 and by spacers 81. The printed circuit board 78 is secured at two places to the printed circuit board 73 by stand-offs 82 only one of which is shown.

A support generally indicated at 83 is shown to include a member 84 having spaced guides 85 for loosely and slidably guiding a mounting member generally indicated at 86. The guides 85 fit into oversized grooves 85', only one of which is shown. The member 84 has spaced tabs 87 having aligned round holes 88 which receive the shaft 68. Two screws 80 secure the support 83 to the section 59. A pair of adjusting screws 89 pass through oversize holes 90 in the member 84, through C-rings 91 and are threadably received in threaded members 92 secured in holes 93 and the mounting member 86. The C-rings 91 are received in grooves 89' and the screws 89 to prevent shifting of the screws 89 axially of the holes 90. Because of the loose sliding fit between the members 84 and 86, rotation of the screws 92, or either one of them, can skew the member 86 to in turn bring the straight line of printing elements on the print head 45 into alignment with the axis of the platen roll 46. The mounting member 86 has a pair of spaced arms 94 with round holes 95 which receive aligned studs 96. A compression spring 97 acting on the member 86 midway between arms 94 and the metal heat sink 98 which mounts the print head 45, urges the print head 45 into pressure contact with the platen roll 46 along a line of contact. The spring 97 also enables the print head to yield to accommodate big labels. The spring 97 nests in a pocket in the mounting member 86 and in a pocket 98' in the heat sink 98. The print head mounting member 86 is preferably constructed from molded plastic material and is of generally U-shaped configuration. The member 86 is preferably relatively flexible and resilient and can twist to enable the print head 45 to compensate for variations between the print head 45 and platen roll 46 due, for example, to manufacturing variations. As shown, the arms 94 are parallel to each other but they can skew due to their flexible and resilient construction. Each arm 94 is joined to a bight portion 93'. Each arm 94 has a hook-like member 86' which snaps under the heat sink 98 to couple the mounting member 86 to the heat sink 98. The members 86' allow for limited movement between the member 86 and the heat sink 98 but prevent their separation.

The guide 42 is shown in FIG. 2 to have a body 100 with a pair of tabs 101 at its one end portion and a pair of tabs 102 at its other end portion. The tabs 101 have studs 103 received in aligned holes and tabs 105 on member 60. The member 83 also has projections 106 having holes 107 for receiving studs 108 on tabs 102. The guide 42 is thus pivotal about studs 103 on the member 60, and by flexing the tabs 102 toward each other, the studs 108 can be aligned with and inserted into the holes 107 to retain the holder 56 in its operative position, where the tabs 102 can be flexed towards each other to enable the studs 108 to be withdrawn from the holes 107, to enable the holder 56 to be pivoted away to allow access to the printed circuit board 71, 73 and 78 for ease of access and disassembly.

With reference to FIG. 3, the mounting member 59 as well as the mounting member 152 are shown in their open or non-operating positions. All of the structure illustrated in FIG. 2 except guide 43 has been pivoted to the open position to expose the print head 45 and the interior of the housing 31. The mounting member 59 pivots about the shaft 68. When the mounting member 59 has been pivoted to the open or non-operating position shown in FIG. 3, the circuitry on the mounting member 59 is separated from the circuitry and mechanisms mounted in the housing 31 by a connector comprising a female portion 203 mounted on the member 59 and a male portion 202 formed on a printed circuit board 189 mounted in the housing 31. When the mounting member 59 is moved to its operative position as in FIG. 1, the connector portions 202 and 203 cooperate to interconnect the electronic and electromechanical circuitry in the member 59 and the housing 31.

Figure 4:
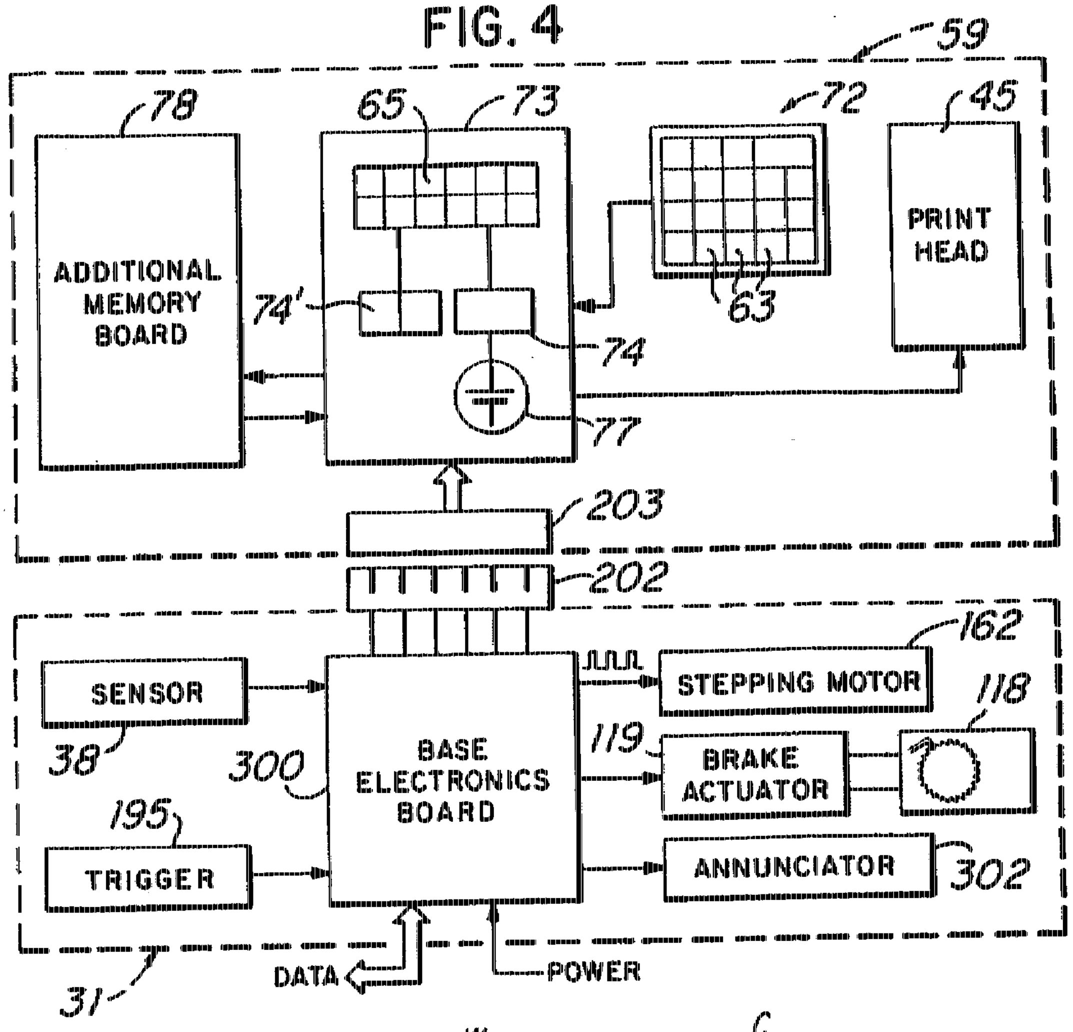
FIG. 4 is a block diagram of the labeler of FIG. 1.

Referring now to FIG. 4, many of the various components illustrated in FIGS. 1–3 are illustrated in block diagram form in FIG. 4. The components mounted on the mounting member 59 and on the housing 31 are grouped separately, with the components mounted on the mounting member 59 being enclosed by the block 59 and the components mounted in the housing 31 being enclosed by the block 31. The connector portions 202 and 203 disposed on the respective housing 31 and mounting member 59 are illustrated to show the interconnection between the components on the housing 31 and the mounting member 59. The housing 31 contains a base electronics board 300 that serves to receive signals from the sensor 38 and a trigger 195 (FIG. 1), as well as data and power. Typically the data may be received from a central computer via a suitable connector mounted on the housing 31, and power may be received from a battery contained within a removable handle affixed to the housing 31. The data applied to the labeler may be received from a central computer and may contain data defining, for example, the type of label to be printed, the format of the label, the font of the characters to be printed as well as currency symbols and price and merchandise identifying codes.

The base electronics board 300 also contains drivers for driving the web advancing motors 162 and a brake actuator or solenoid 119 that releases a brake 118 that maintains the web C in a fixed position relative to the print head 45 except when the motor 162 is energized to prevent the web C from shifting with respect to the print head 45, particularly when the label is being applied to an article of merchandise. An annunciator 302, which may be an audible beeper or the like, is used to provide prompts to the operator during the programming and operation of the labeler.

While the housing 31 contains most of the circuitry for performing the web advance and braking functions, the supporting member contains most of the circuitry for providing the data inputting, computational and printing functions. Data received via the keypads 63 of the keyboard 72 is applied to the circuit board 73 which contains the display 65 and the microprocessor 74 as well as additional circuitry generally indicated as 74' and a backup battery 77. Based on the data received via the keyboard 72 and other data received from the base electronics board 300 in the housing 31 via the connector portions 202 and 203, the circuitry on the board 73 energizes the print head 45 in the appropriate sequence to print the desired information on the web C. The additional memory board 78 is optional and is utilized only when additional features, such as, for example, the ability to print bar codes and non-standard characters is desired.

In controlling the printing of a label and determining the length of the labels on a web, it is necessary accurately to control the advancement of the web by the motor 162. In the illustrated embodiment, the motor 162 is a stepping motor which is energized by a series of pulses. The motor advances a fixed increment in response to each pulse it receives. Consequently, the angular rotation of the shaft of the motor 162 is directly proportional to the number of pulses received by the motor, and the amount the web is advanced is also directly proportional to the number of pulses received by the motor. Thus, by counting the number of pulses, the amount that the web has been advanced can be determined. Examples of printers using stepping motors are disclosed in the aforementioned U.S. Pat. Nos. 4,264,396, 4,442,774, 4,556,442 and 4,603,629 incorporated herein by reference.

Another way of determining the position of a motor shaft is to utilize a shaft encoder or tachometer that is driven by the motor. When a shaft encoder or tachometer is used, the motor 38 need not be a stepping motor, but may be any type of suitable motor. Various types of shaft encoders and tachometers exist, including those that provide an output pulse each time the motor shaft rotates a predetermined number of degrees. Thus, by counting the pulses produced by the tachometer or shaft encoder, the degree of advancement of the motor shaft and web can be determined as in the case of counting stepping motor pulses. Examples of labelers utilizing shaft encoders are disclosed in U.S. Pat. Nos. 4,584,047 and 4,578,138.

Thus, if a stepping motor is utilized or if a shaft encoder or tachometer is utilized, the number of stepping motor pulses or shaft encoder pulses can be monitored to control the operation of the printer during the printing cycle, to calibrate the system to print different types of tags, and to indicate a jam. For example, if the length of a label is known, the web is advanced by a predetermined number of pulses corresponding to the length of the label during each printing cycle. If the length of the label is not known, the number of pulses produced between the sensing of successive indices on the web may be counted, and based on that count the length of the label determined. After the length has been determined, the web can be advanced by an amount corresponding to the length thus determined during subsequent printing cycles. Also, the pulses from the tachometer or stepping motor can be used to indicate a jam condition. For example, if the lengths of the longest and shortest labels to be printed are known, a jam condition exists if the motor stops before a predetermined number of pulses corresponding to the shortest label have been generated. Similarly, a jam condition exists if the number of pulses between the sensing of successive indices exceeds a number proportional to the longest label to be printed similarly, if the dimension of the index mark in the direction of the longitudinal axis of the web is controlled, and the number of pulses required to advance the web by an amount equal to that distance is known, that number can be stored and used to indicate a jam condition. Thus, if the index mark should remain under the sensor for more than the number of pulses required to advance it from under the sensor another jam condition can be indicated. The manner in which stepping motor pulses or shaft encoder pulses are used to control the operation of the printer according to the invention will be discussed in a subsequent portion of the specification.

Figure 6:
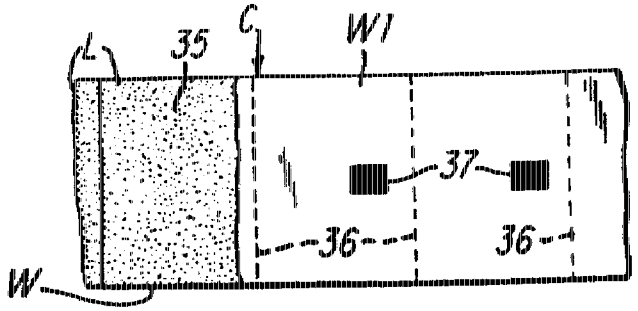
FIG. 6 is a bottom plan view of the composite label web shown in FIG. 5.

As previously discussed, the composite web C contains a plurality of labels L that are releasably secured to the carrier web W, and that marks may be provided, for example, on the underside of the carrier web W for sensing by the optical sensor 38 in order to control various functions of the labeler. The composite web C is illustrated in greater detail in FIGS. 5 and 6, and is shown to include a carrier web w having a coating of release material 34 such as silicone-indicated by light stippling. Labels L are releasably secured by pressure sensitive adhesive 35 indicated by heavy stippling to the release material 34. The labels L are formed from a web W1 of label material severed by complete lines of severing 36. The lines of complete severing 36 are hidden in FIG. 6 and are thus shown by broken lines. Marks 37 preferably on the underside of the carrier web W are preferably solid and rectangular and are adapted to be sensed by the optical sensor 38 for the purpose of controlling various labeler functions. The marks 37 are hidden in FIG. 5 and are thus shown by broken lines.

The distance between the marks or indices 37 on the composite web C is representative of the lengths of the labels L and is used to control the registration between the print head 45, the delaminator 47 and the labels L to assure that the printing is properly positioned on each label as the label is printed, and that a label positioned for application to an article of merchandise at the end of a printing cycle. In addition, the spacing between the marks or indices 37 may be used to control the distance the web is advanced during each printing operation in order to automatically accommodate labels of different lengths. Also, the length of the marks or indices 37 along the longitudinal dimension of the composite web C is selected to be a predetermined dimension, for example, 0.25 inch. Thus, the time required for the mark 37 to pass under the sensor 38 may be measured to insure that the composite web C is moving properly relative to the sensor 38. If the mark 37 takes too long to pass under the sensor 38, as measured by counting stepping motor or tachometer pulses, a jam condition is indicated.

Utilizing a web having registration marks or indices that are relatively long along the direction of travel of the web has several advantages over using a web that bears indices that are relatively short in the direction of travel. Firstly, a web that has marks with relatively long dimensions can easily be printed by relatively unsophisticated printing equipment. Secondly, such indices can be easily detected and do not require a high resolution sensing device. Thirdly, since such indices have a known dimension along the direction of travel of the web, they provide more information than do relatively short indices. For example, because relatively long indices have two detectable edges, they provide location information at two locations on each label as well as information as to whether or not an index is positioned under the sensing device. The presence of an index under the sensing device for an extended period of time may be used to provide an early indication of a jam as discussed above. Finally, the defined length of the indices allows for tolerances in the advancing mechanism while still maintaining an accurate top of form indication, i.e., an indication that defines the registration or relative position between the record members and the print head.

An example of how relatively long indices may be used to control the operation of a printer follows. To assure that a label is properly positioned relative to the printing head, whenever a web advancing command is received, the sensor 38 (FIG. 4) is polled by the base electronics board 300 to determine if an index is present beneath the sensor 38. If an index is detected, the web is advanced by a distance corresponding to, for example, seven stepping motor or tachometer pulses. In the present example, each stepping motor or tachometer pulse corresponds to 0.0075 inch, and thus, seven pulses correspond to 0.0525 inch. After the seventh step of advance, the sensor 38 is again polled to determine if an index is present, if it is no longer present, this indicates that the label is properly positioned and printing can be initiated. If it is still present, the various jam criteria discussed in a subsequent of the specification are examined and a jam indication is provided, if appropriate. If no jam is sensed, the web is advanced to the next index and the process is repeated.

Assuming that the web is properly positioned, printing may proceed, when the next index mark is sensed, the advancement of the web is not immediately terminated, but the web is advanced twenty-eight more steps, in the present example, so that the sensor now lies approximately 0.21 inch into the mark, or about 80% of the way into the mark. Thus, upon the initiation of the next print cycle, the web must be advanced another 0.04 inch (for a mark 0.25 inch long) or about 20% of the length of the mark before the index clears the sensor. This corresponds to a distance that lies between five and six steps (0.0375 inch and 0.045 inch, respectively). Thus, if the mark has cleared the sensor within seven steps as discussed above, it indicates that the web is properly positioned. The above operations can be readily controlled with a detector that has only 0.1 inch resolution i.e., a detector that has a field of view of 0.1 inch in diameter. Thus, an index mark can fill the entire field of view of the detector. Such a detector would have difficulty in detecting an index that was much narrower than 0.1 inch, but can easily detect a mark having a length of 0.25 inch because the resolution of the detector is about 40% of the length of the mark.

Figure 9:
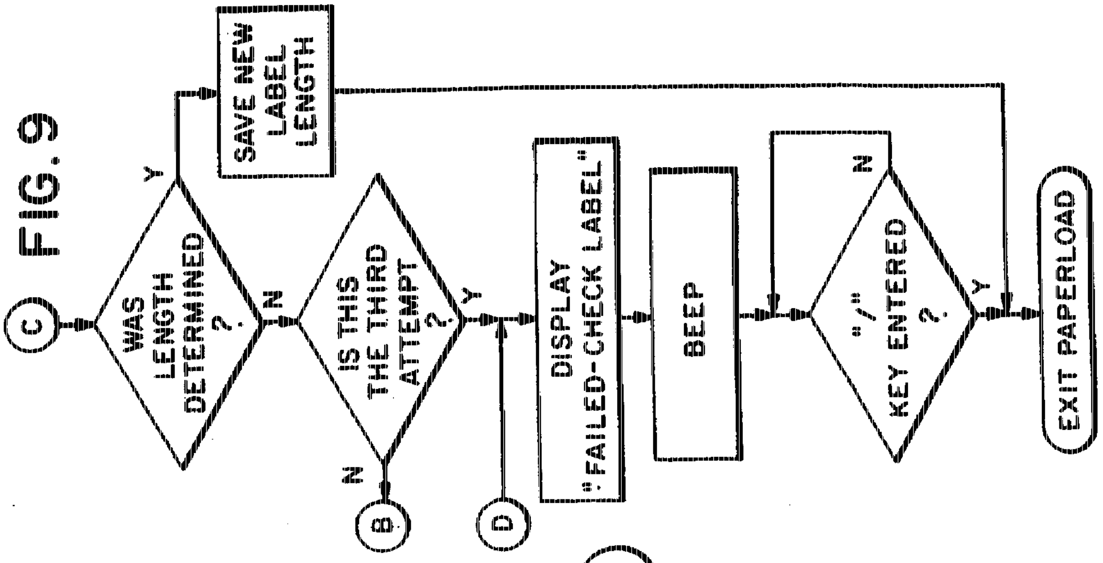
FIGS. 7–10 are logical flow diagrams indicating the logical sequence of operations performed by the labeler of FIG. in its paper loading mode.
Figure 8:
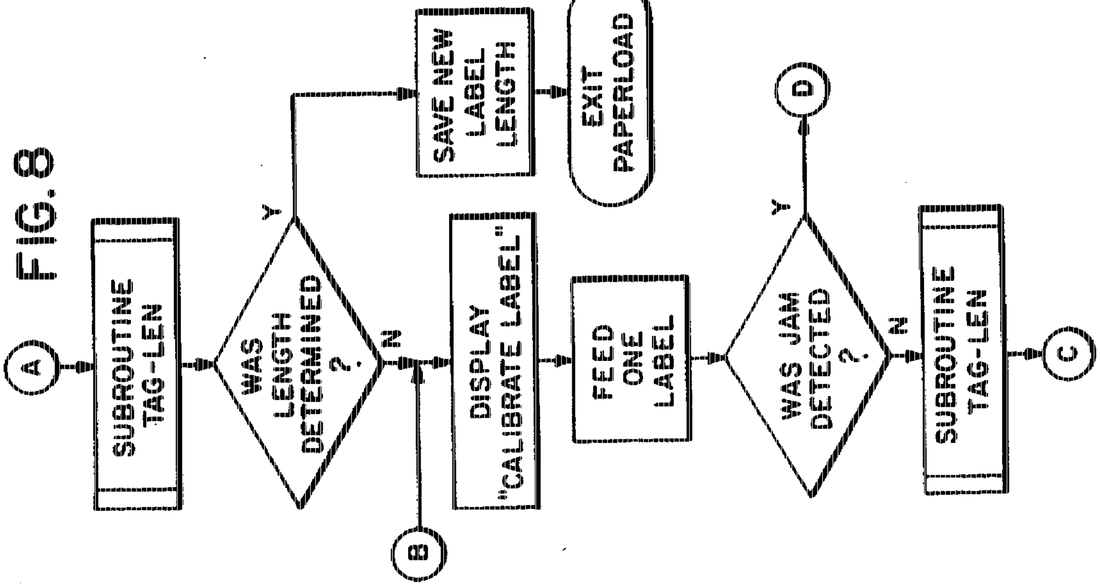
Figure 7:
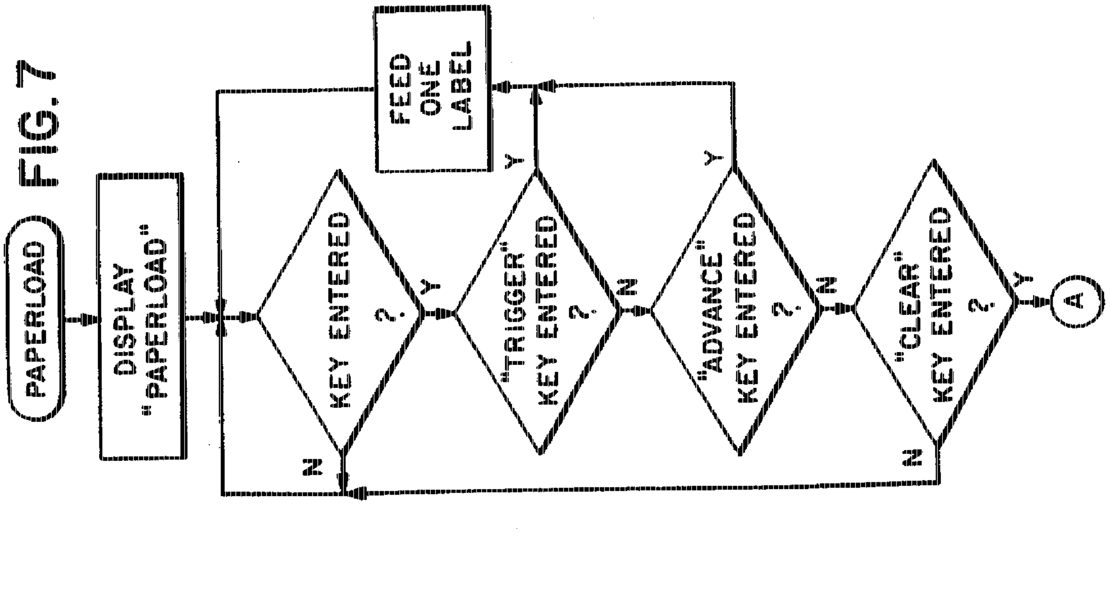

In a labeler of the type disclosed herein, it is convenient to initialize the system to determine the length of the labels on a new web when the new web is installed, and to check for a jammed web condition immediately after a new roll of labels has been placed in the machine. When a new roll has been inserted, as determined by a sensor in the path of the web or by a sensor positioned at an access door to the labeler, a routine that checks for a jam condition and also for label length is called. In the illustrated embodiment, this routine is called PAPERLOAD and is illustrated in FIGS. 7–9.

When the PAPERLOAD routine is called, the labeler displays the word 'reloading' on the display 65. After the word 'reloading' has been displayed, the routine determines whether any key has been actuated or entered (FIG. 7). If not, the word 'reloading' will continue to be displayed by the display 65. If a key has been depressed, the routine determines whether the key depressed was the trigger 195 or another key on the keyboard (such as a right arrow key) that advances the web, if either of these keys was depressed, the labeler simply feeds one label and again displays the 'reloading' message. If the key depressed is neither the trigger key nor the advance key, a determination is made whether the depressed key was the clear key. If not, the display of the word 'reloading' is continued without feeding a label.

If, however, the clear key was depressed, it is indicative that the operator desires to calibrate the labeler to accommodate the length of the labels on the web installed in the labeler. Thus, in the event that the clear key is depressed when the word 'reloading' is being displayed, the tag length calibrating subroutine TAG-LEN is called (FIG. 8). The subroutine TAG-LEN called in FIG. 8 is illustrated in greater detail in FIG. 10, but the description of the PAPERLOAD routine will be completed before describing the subroutine TAG-LEN in detail.

After the subroutine TAG-LEN has been called (FIG. 8) a determination is made as to whether the length of the tag was determined by the subroutine. If the length was determined, the new length will be stored and the PAPERLOAD routine exited. If not, the term 'calibrate label' will be displayed and one label will be automatically fed. A determination is then made as to whether a jam was detected. The criteria for detecting a jam will be discussed in a subsequent portion of the specification, but if under those criteria a jam was detected, the labeler would display the term 'failed check label' (FIG. 9) and cause the annunciator 302 to generate a beep. If the operator then entered a slash mark i.e., the symbol "/" after the beep, the routine PAPERLOAD would be exited.

If a jam was not detected after the feeding of a label (FIG. 8) the subroutine TAG-LEN would again be loaded. After the loading of the subroutine TAGLEN, a determination would be made as to whether a tag length was determined, if so, the new label length would be saved and the routine PAPERLOAD exited. If the length was not determined, a determination would be made as to whether the attempt to determine label length was the third attempt. If not, the term 'calibrate label' would again be displayed a label would be fed, a jam detection test applied and the subroutine TAG-LEN recalled in an attempt to again determine the tag length (FIG. 8). After the subsequent attempt, if the length was determined, the new length would be saved and the routine PAPERLOAD exited. If not, the determination as to whether this was the third attempt would again be made and if it were not the third attempt, another attempt would be made. If it were the third attempt, then the term "failed check label" would be displayed and the beep generated by the annunciator 302 as in the case of a jam detection. Subsequent to the generation of the beep, the PAPERLOAD routine could be exited by depressing the "/" symbol key.

Figure 10:
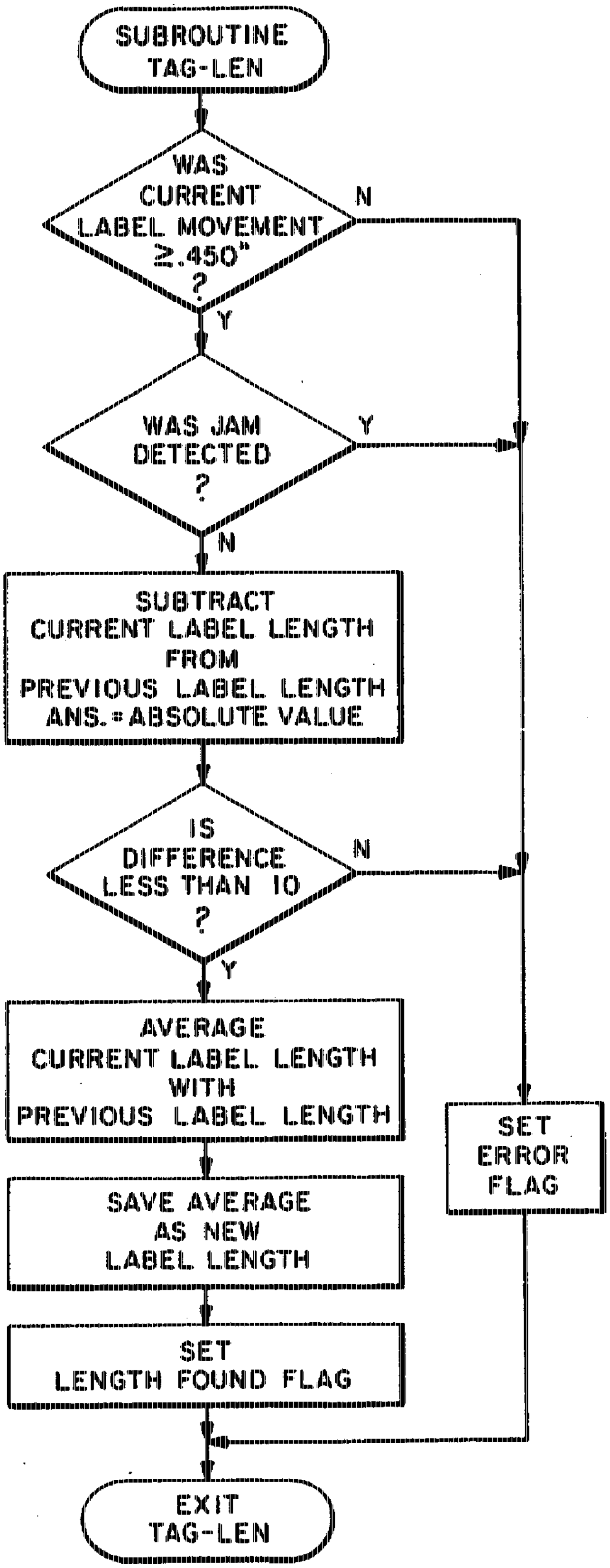

Referring now to FIG. 10, a determination is made as to whether the movement of the label was greater than or equal to 0.450 inch which is approximately equal to twice the length an index mark. If not, this condition is indicative of a jam, and an error flag is set and the TAG-LEN subroutine exited.

If the current label movement was equal to or exceeded 0.450 inch, a determination is made as to whether a jam was detected under any other jam criterion. As previously stated, the jam detection criteria will be discussed in a subsequent portion of the specification, but if a jam was detected under any of these criteria, the error flag will be set and the TAG-LEN subroutine exited. If a jam was not detected, the current label length is subtracted from the previous length. A determination is then made as to whether the difference is less than a predetermined amount, for example, less than 10 stepping motor counts or 10 tachometer pulse counts. Because the labels should all be approximately the same length, if this difference is exceeded, an error flag is set and the TAG-LEN subroutine again exited.

If the difference is less than the predetermined amount, the average of the lengths of the current label and the previous label is determined, and the average is then saved as the new label length. The "length found" flag is then set and the TAG-LEN routine is exited. The tag length thus found is useful for determining the amount of memory that must be allocated to store the print data required to print information on the label, to define the format of the label or to determine whether the print data entered by the operator is compatible with the labels on the web loaded into the labeler.

In accordance with another important aspect of the invention, several jam detecting criteria are provided. The jam detecting criteria utilize not only information relating to the distance between successive indices on the web, but also information relating to the dimension of the indices along the longitudinal axis of the web. This information is used in conjunction with information defining the longest and shortest labels that can be printed to define the jam criteria.

For example, let us assume that the longest label that can be printed is 2.5 inches long, and that the length of the index mark along the longitudinal axis of the web is 0.25 inch. It should also be understood that the above distances are given for illustrative purposes, and that other values can be chosen. Assuming the values given above, since the length of an index mark is 0.25 inch, this distance sets one of the jam criteria, that is, if the web does not travel at least 0.45 inch, as discussed above, a jam condition is indicated.

The maximum label length also sets one of the jam criteria. Since the length of the longest label to be printed is 2.5 inches, then the distance between successive index marks should not exceed 2.5 inches, and if it does, a jam condition is indicated. However, in the present embodiment, the jam criterion is set so that a jam indication is provided if the distance between the successive index marks exceeds 1.25 times the length of the longest label to compensate for various tolerances. Thus, in the present example, a jam is indicated if the web travels more than 3.125 inches without detecting an index mark.

As previously stated, the jam sometimes occurs at the beginning of a printing cycle, and in such an instance, the dimension of an index mark in the direction of travel may be used to detect the jam more quickly than would be the case if only the distance between index marks were used. For example, in the illustrated embodiment, the length in the direction of travel of each index mark is 0.25 inch. Consequently, if the index mark continues to be sensed for an interval that corresponds to a web advance of more than, for example, two times 0.25 inch, or 0.5 inch, a jam indication is provided. Thus, the jam condition can be detected without having to determine whether the next index mark is found within 1.25 times the length of the longest label.

As previously discussed, another feature of the present invention is the provision of a normally engaged brake in the path of the web to prevent the web from moving except when it is being advanced by the drive motor. Mechanically, in the present embodiment, the platen roller 46 (FIG. 1) is prevented from rotating by means of a suitable braking mechanism (not shown in FIG. 1). Various types of braking mechanisms may be employed, but in the embodiment illustrated schematically in FIG. 4, the brake 118 consists of a toothed wheel and pawl arrangement mounted on the shaft of the platen roller. The pawl is normally biased into engagement with the toothed wheel, and serves to prevent the platen roller 46 from rotating except when the brake is released by the brake actuator 119, which may be an electrically operable solenoid.

The energization of the actuator 119 is microprocessor controlled, with the actuator 119 being energized only when the web is being advanced in order to conserve electrical power. The actuator 119 is controlled by the MOTOR/BRAKE subroutine illustrated in FIG. 11.

Figure 11:
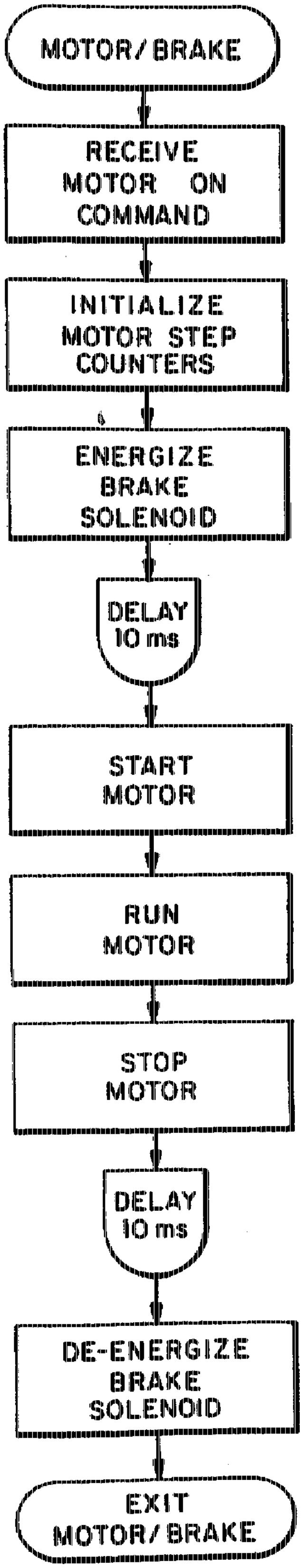
FIG. 11 is a logical flow diagram indicating the steps performed in the control of the advancing motor and brake of the labeler of FIG. 1.

Referring to FIG. 11, the MOTOR/BRAKE routine controls the operation of both the motor 162 and the brake actuator 119. When the MOTOR/BRAKE routine receives the 'motor on' command, the motor step counters are initialized. The 'motor on' command is received whenever it is desired to advance the web either for printing purposes or for label calibration purposes, and is typically generated when the trigger 195 is actuated.

After the motor step counters have been initialized, the solenoid 119 is energized to release the brake mechanism 118. A delay of 10 milliseconds is provided to permit the brake 118 to disengage. After the 10 millisecond delay, the motor 162 is energized and permitted to run. As the motor runs, the stepping motor or tachometer pulses are counted until the count reaches the count determined by the motor step counters, or in the case of calibration, until the next index mark is found. When the count reaches the count determined by the motor step counters or the next index mark is found, the motor is deenergized. A 10 millisecond delay is provided to permit the motor to stop rotating. The brake solenoid 119 is then deenergized and the MOTOR/BRAKE subroutine is exited.

As stated above, one way to provide registration of the web relative to the print head is to detect the leading edge of an index mark on the web and then to step the web a predetermined number of steps past the leading edge to assure that the sensor is positioned over the index mark at the beginning of the next print sequence. However, the system described above is susceptible to positioning variations caused by variations in the apparent length of the index mark sensed by the sensor. The apparent length of the index mark is a function of several factors, including the actual length of the printed mark, the density of the printed mark, circuitry tolerances and the sensitivity of the sensor. The physical size and density of the printed mark can vary as a function of the amount of ink applied to the web during printing and the reflectivity of the ink used. Circuitry tolerances also can cause variations in the position at which-the edge of the mark is detected. The sensitivity of the sensor affects the apparent length of the mark because sensor sensitivity determines the amount of white background in its field of view required to detect white, and thus, affects the apparent position of the transition from black to white or white to black sensed by the sensor. Variations in sensor sensitivity are likely to be the major factor in variations in the apparent length of the index marks sensed by the system.

Figure 12A:
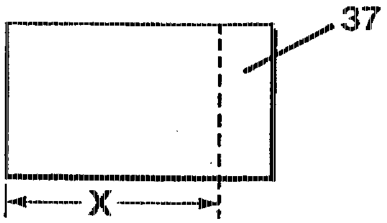
FIGS. 12(*a*)–12(*c*) are illustrations showing positioning errors that can be caused by variations in the apparent length of the index marks sensed by the sensor.
Figure 12B:
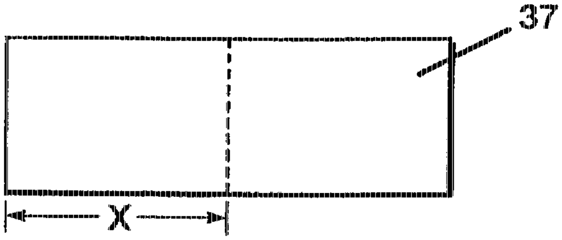
Figure 12C:
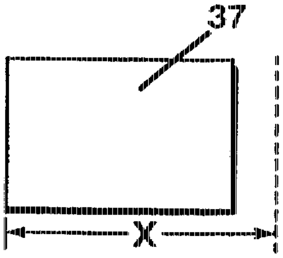

The manner in which variations in the apparent length of the index marks affects the positioning of the web is illustrated in FIG. 12. In FIG. 12(*a*) there is shown an index mark 37 of nominal apparent length. When such a nominal length mark is detected by the detecting system previously described, the leading edge is detected, and the web is advanced a predetermined number of steps beyond the leading edge to assure that the sensor lies over the mark. For a nominal length mark, utilizing the system previously described, the web would be advanced 28 steps into the mark, or approximately 80% of the way into the mark. This distance is indicated by the distance X in FIG. 12(*a*).

In the event that the apparent length of the mark 37 is longer than the nominal length, as illustrated in FIG. 12(*b*), the web would still be advanced by the distance X beyond the leading edge of the mark 37. However, because of the greater apparent length of the mark 37, the distance X would not correspond to 80% of the length of the mark 37 but to a smaller percentage of the length. Because the apparent length of an index mark generally varies substantially symmetrically about the center line of the mark, the earlier detection of the leading edge of a relatively long mark shifts the stopping point of the web relative to the center line of the index mark, thus causing misregistration. For example, for a nominal length mark as illustrated in FIG. 12(*a*), the web would be stopped with the sensor being located well past the center line of the mark 37, whereas for a longer index mark as illustrated in FIG. 12(*b*), the web would be stopped with the sensor positioned approximately at the center of the index mark 37.

An even more serious situation can be caused by an index mark having an apparent length that is shorter than the distance X. Such a situation is illustrated in FIG. 12(*c*). As is illustrated in FIG. 12 (*c*), the apparent length of the mark 37 is less than the distance X. Consequently, when the leading edge of the mark is sensed and the web is stepped by an amount equal to the distance X, the sensor is no longer over the mark 37, but over a white area of the web. The sensing of the white area can be interpreted by the system as a misregistration of the web, and the system will continue to feed blank labels until the web is stopped with the sensor over an index mark.

Figure 13A:
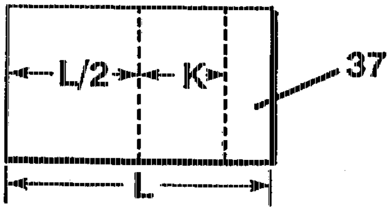
FIGS. 13(*a*)–13(*c*) are illustrations showing how the positioning errors are corrected by the system according to the invention.
Figure 13B:
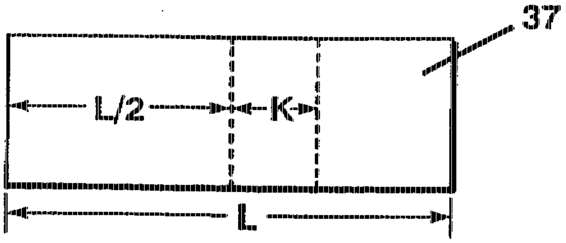
Figure 13C:
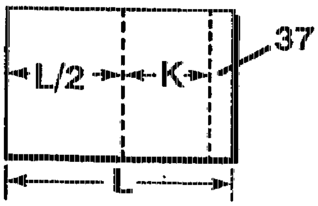

In order to avoid the problems associated with feeding the web a fixed distance beyond the apparent leading edge of an index mark, an adaptive system has been provided. The operation of such an adaptive system is illustrated in FIG. 13. In the system illustrated in FIG. 13, the length, L, of an index mark 37 is determined by feeding a label through the system. The length, L, is determined by sensing the leading and trailing edges of the mark 37 and counting the number of stepping motor or tachometer pulses produced between the detection of the leading and trailing edges. The length, L, thus determined is divided by two to define the center of the mark relative to the leading edge. If desired, the distance to center, L/2, may be added to a constant K if it is desired to advance the web beyond the center of the mark, and the sum of L/2 and K used to determine the number of pulses that the web is advanced into the index mark after the printing of a label. As is illustrated in FIG. 13, advancing the web a distance of L/2 into the index mark always locates the center line of the index mark. The subsequent advancing of a constant amount K beyond the center line then positions the sensor a predetermined amount into the mark beyond the center line, and thus assures that the sensor is always positioned at the same position relative to the-center line of the index mark regardless of the apparent length of the index mark. To provide additional accuracy, the amount that the web is advanced per step is reduced to 0.00375 inch per step. In the illustrated embodiment K is made equal to 20, and thus, the web is advanced 0.075 inch past the center line of the index mark.

Figure 14:
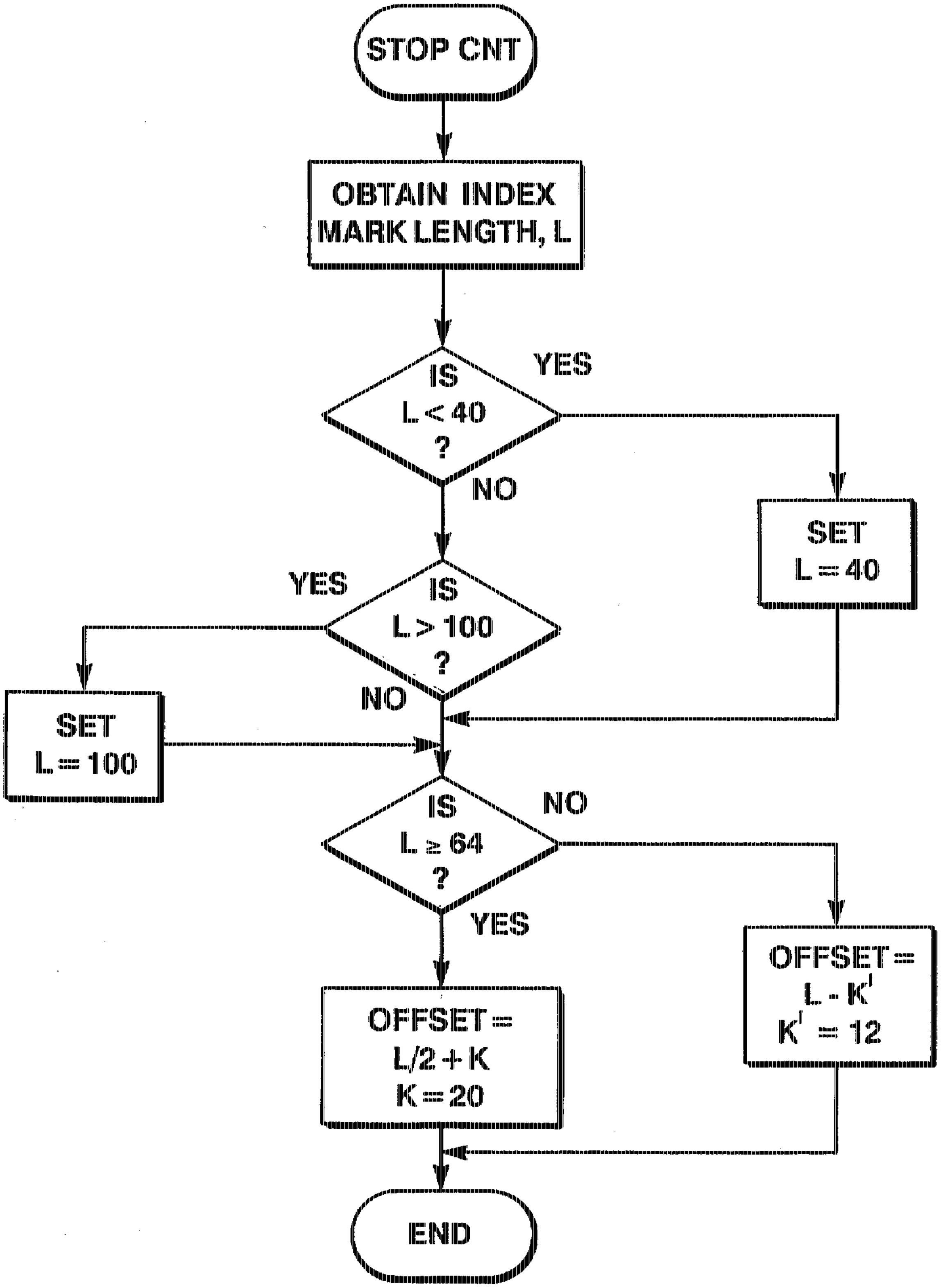
FIG. 14 is a logical flow diagram illustrating, the logical sequence of operations performed by the printer to correct positioning errors.
Figure 15A:
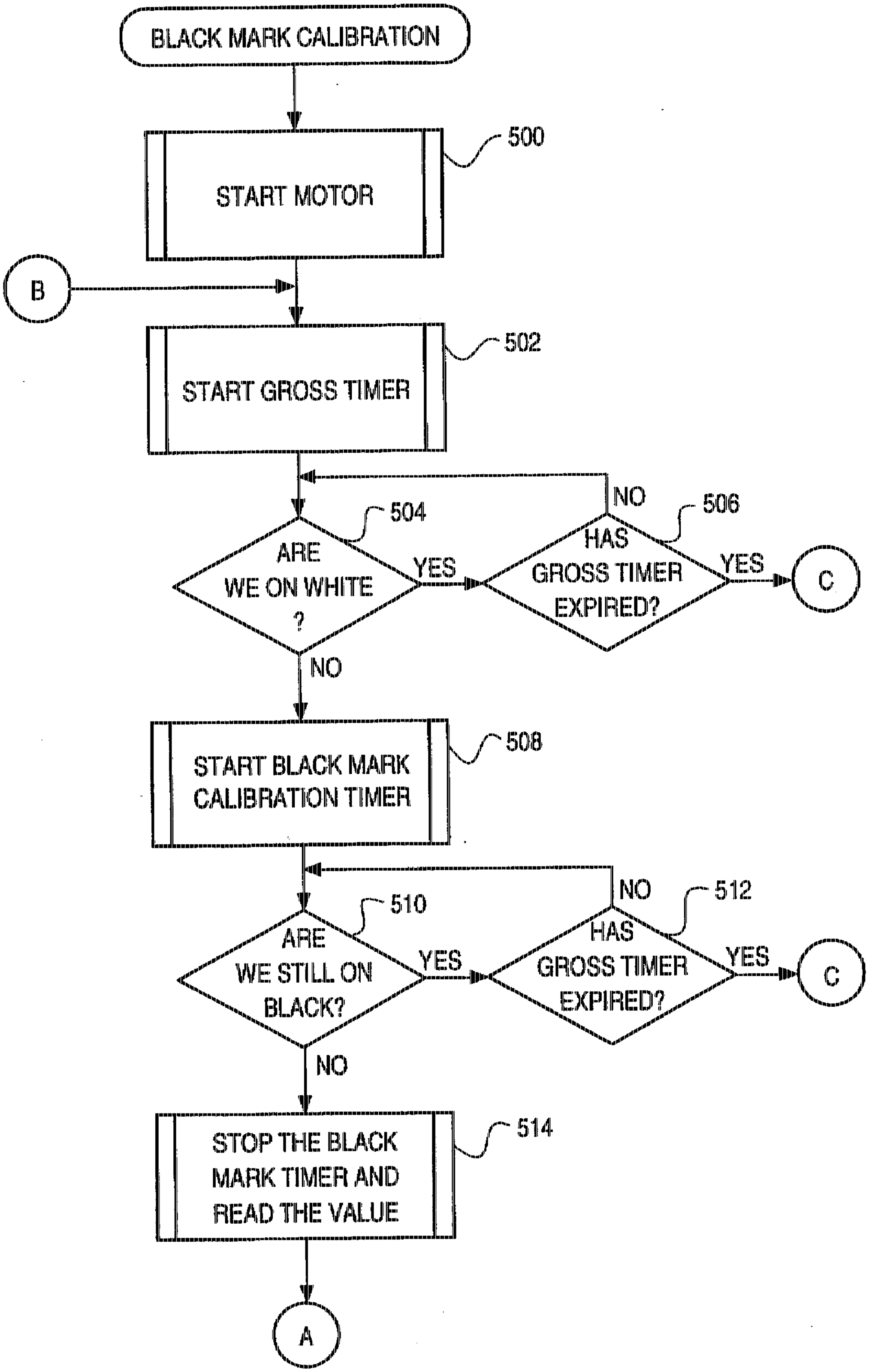
FIGS. 15A–15D form a logical flow diagram illustrating a black mark calibration scheme in accordance with a second embodiment of the present invention.
Figure 15B:
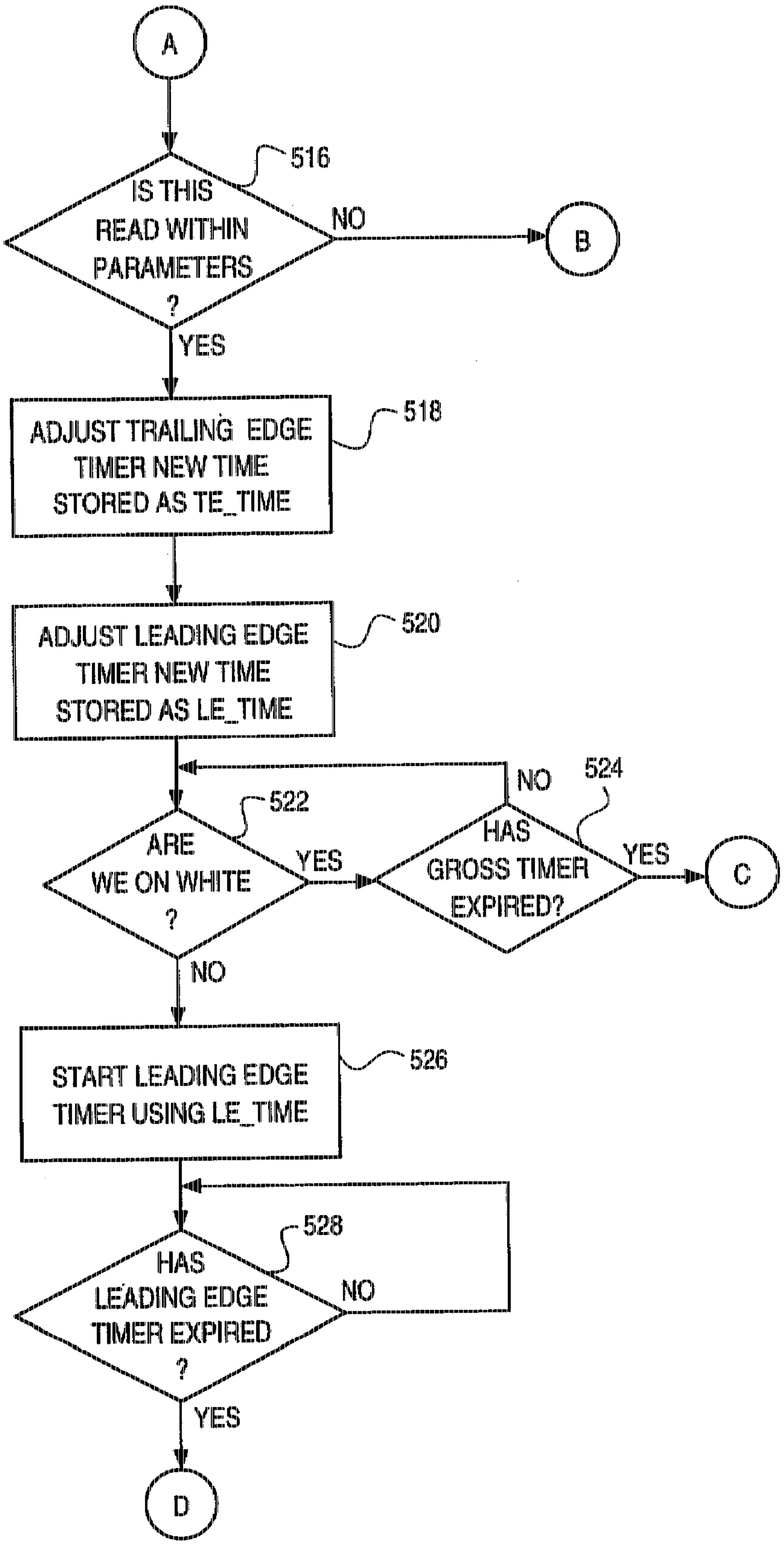
Figure 15C:
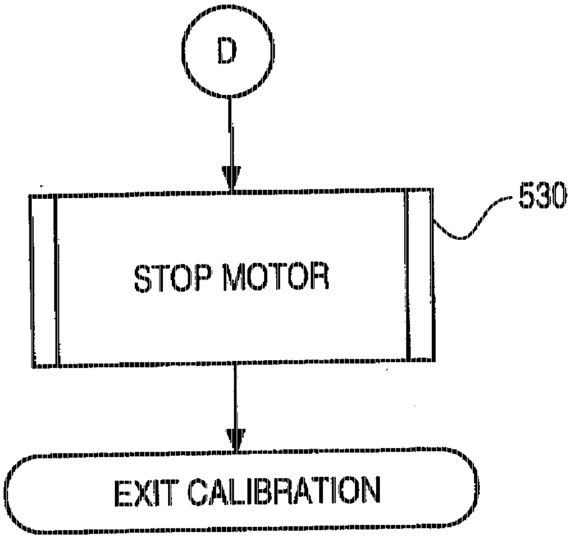
Figure 15D:
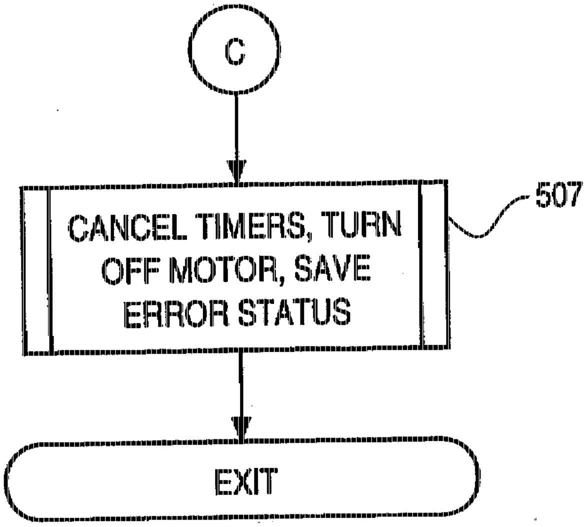
Figure 16A:
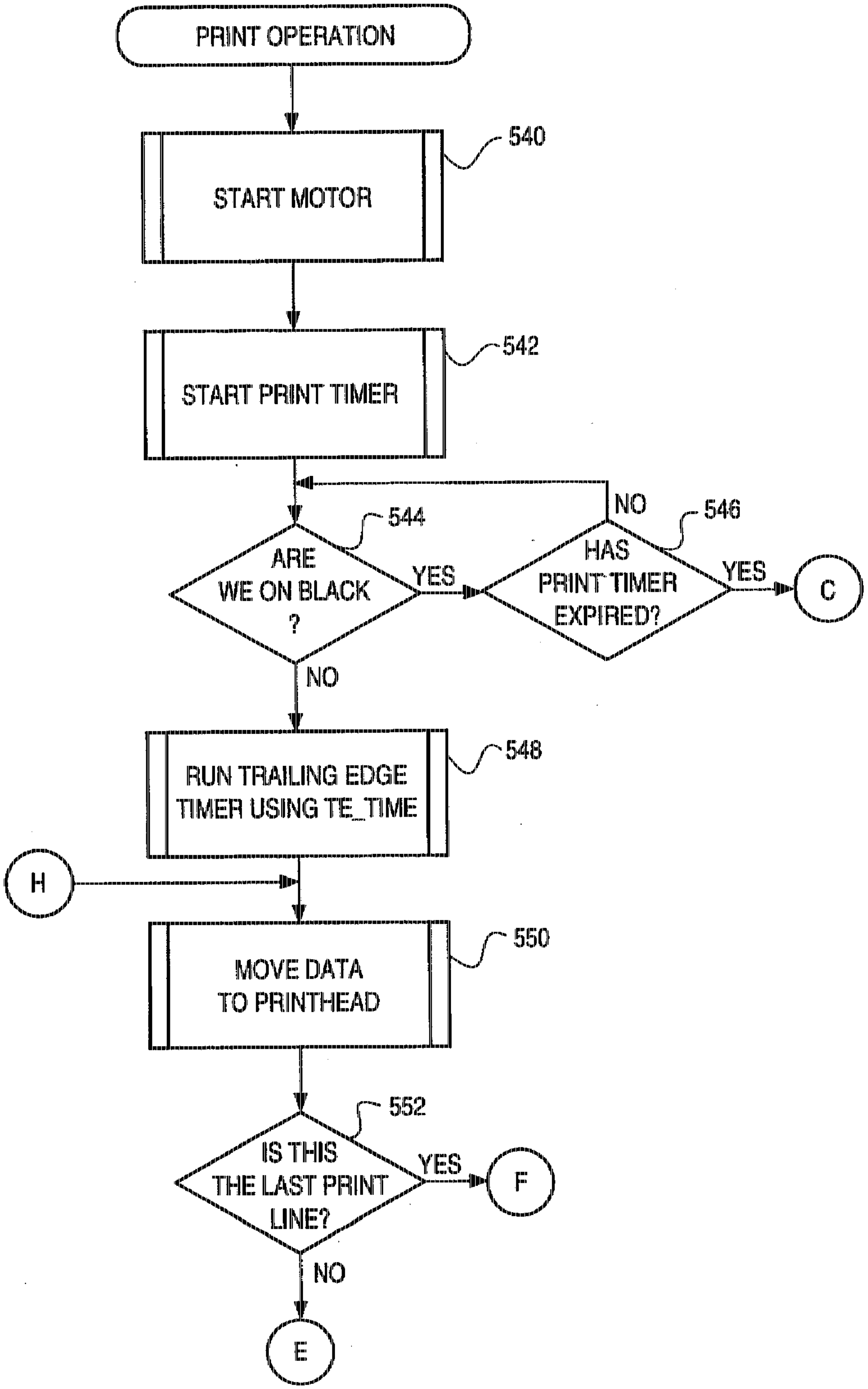
FIGS. 16A–16D illustrate a flow diagram of a print operation in accordance with the second embodiment of the present invention.
Figure 16B:
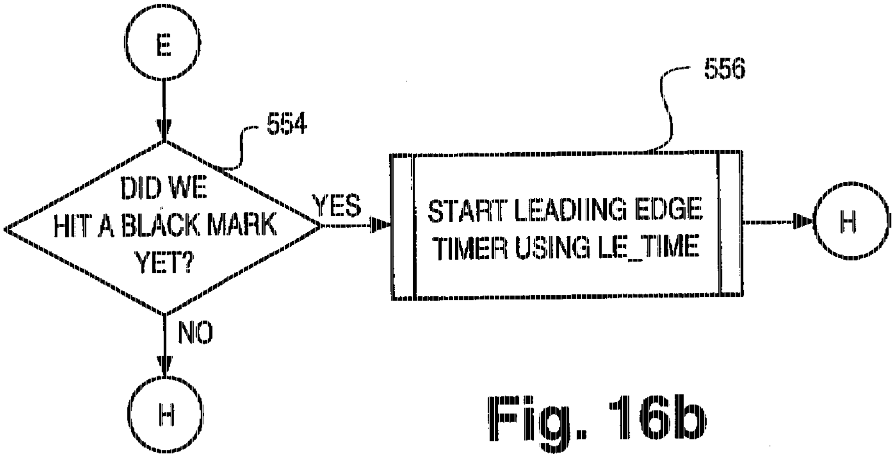
Figure 16C:
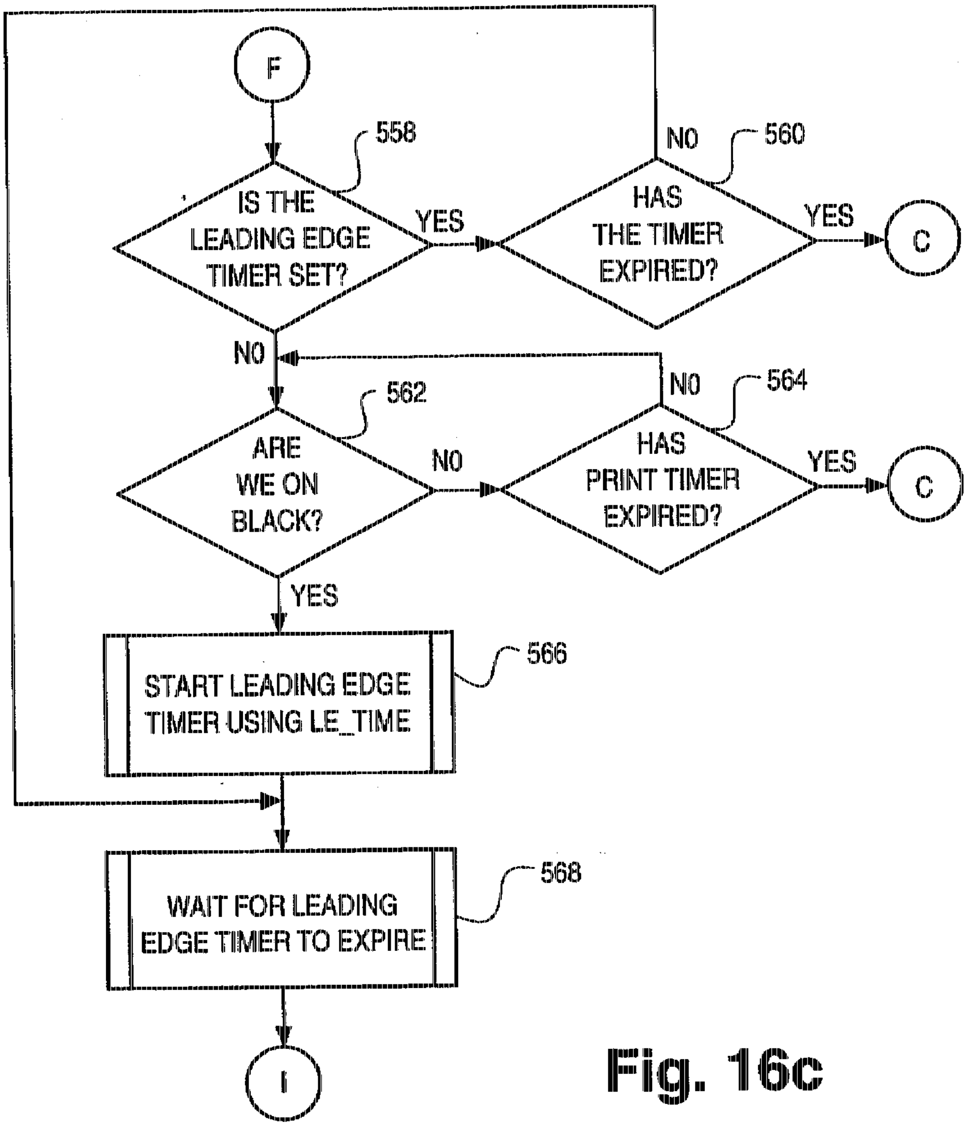
Figure 16D:
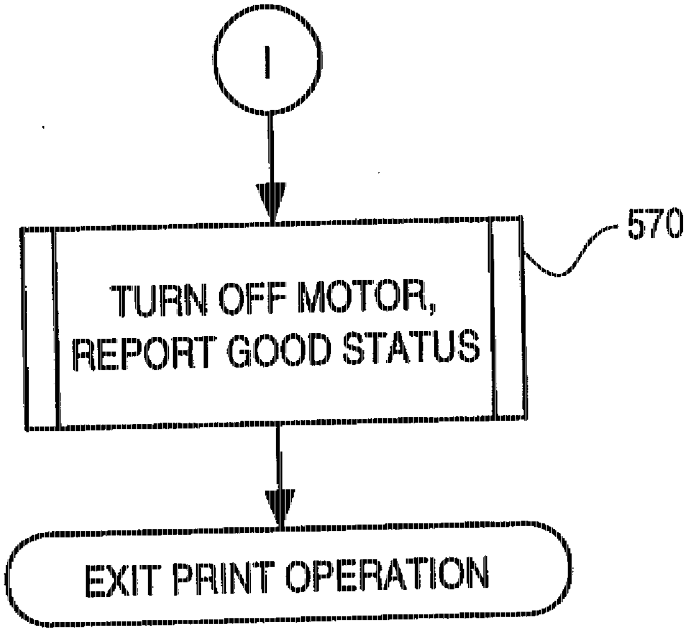

The logical sequence of operations utilized to determine where the index mark should be stopped relative to the sensor is performed by a subroutine entitled STOP CNT illustrated in FIG. 14. When the subroutine STOP CNT is called, the length, L, of an index mark is obtained. The length may be obtained by feeding a label during a calibration cycle, or may be obtained by measuring the length of a previously printed label or both. In the preferred embodiment, the length is measured each time a label is fed, and the last measured length is used as the length, L. As also previously described, the length, L, is measured by counting the number of stepping motor or tachometer pulses produced between the detection of the leading and trailing edges of an index mark.

Once the length, L, of the index mark is determined, a determination is made as to whether or not the length, L, is less than 40 steps. This corresponds to approximately 0.15 inch and approximates the shortest length index mark that is expected. Thus, if the length L is less than 40 steps, it is set to a value of 40 steps which corresponds to the minimum length index. If the length is not less than 40 steps, a second determination is made as to whether it is greater than 100 steps. One hundred steps corresponds to approximately 0.375 inch which is the length of the longest expected index mark. Thus, if it is longer than 100 steps, L is set to 100 or the value equal to the longest expected mark. After the length of the index mark has been measured and, if necessary, set to a value between 40 and 100, a determination is made as to whether L is greater than or equal to 64. The value of 64 corresponds to a mark having a length of 0.24 inch or approximately the nominal value of 0.25 inch. If the value of L is greater than or equal to 64, thus indicating that the length of the mark is at least as long as a mark having a nominal length, then the offset is calculated by making the offset equal to L/2 plus K as is also illustrated in FIG. 13. In the illustrated embodiment, K is set to 20, which corresponds to approximately 0.075 inch, thus positioning the sensor 0.075 inch past the center line of the mark.

In the event that L is less than 64, thus indicating a shorter than nominal mark, the offset is made equal to L minus K'. In the illustrated embodiment K' is made equal to 12 in order to position the sensor approximately 0.045 inch from the trailing edge of the mark to assure that the web will not be advanced by an amount that will position the sensor beyond the trailing edge of the mark. The offset thus determined is then used to determine the amount that the sensor will be advanced into the mark during the printing of the next label.

An alternate embodiment of the present invention is illustrated in FIGS. 15 and 16. In accordance with this embodiment, the length of a mark or indice 37 is determined during a calibration routine shown in FIGS. 15A–15D. The measured length of the mark is used to control the value of a number of software timers that are in turn used to control the motor driving the web W so that movement of the web is stopped with the sensor 38 detecting a mark 37. The measured length of the mark is also used to determine a top of form position on the label where the top of form position is that position on the label at which printing may begin. The calibration routine depicted in FIGS. 15A–15D may be run only once per roll of labels. Alternatively, the calibration routine can be run at any time as discussed above. Further, this embodiment, like the previously described embodiment may utilize a web having an index mark or indice 37 of various lengths for example 0.25 inch, 0.30 inch, etc. where the length of the mark is generally constant throughout a roll of labels but may vary from one roll to another.

At the start of the calibration routine, the motor advancing the web is started at block 500. As discussed above, the motor may be a stepping motor such as the motor 162 or it may be a D.C. motor. The microprocessor 74 at a block 502 then starts a gross timer that is used for jam detection. After starting the gross timer, the microprocessor 74 proceeds to block 504 to determine whether the sensor 38 is detecting the absence of a mark 37. If so, the microprocessor 74 proceeds to block 506 to determine whether the gross timer set at block 502 has expired. If the gross timer has expired without detecting a mark 37 as determined at block 506, the microprocessor 74 proceeds to block 507 shown in FIG. 15D. At block 507 the software timers are cancelled, the motor is turned off and an error status is saved in the microprocessors memory.

If a mark 37 is detected at block 504 prior to the expiration of the gross timer, the microprocessor 74 proceeds to block 508 to start a mark calibration timer, the content of which when stopped prior to the expiration of the gross timer, represents the length of a mark or indice 37 from the leading edge of the mark detected at block 504 to the trailing edge of the mark detected at block 510. More particularly, after starting the mark calibration timer at block 508, the microprocessor proceeds to block 510 to determine whether the sensor 38 is still detecting the presence of the mark. If so, the microprocessor proceeds to block 512 to determine whether the gross timer has expired. If the gross timer has expired, the microprocessor proceeds to block 507. Otherwise, block 510 is returned to. When the trailing edge of the mark is detected at block 510, the microprocessor 74 proceeds to block 514 to stop the mark calibration timer and to read the values stored therein. As discussed above, the value read at block 514 represents the actual or measured length of the black mark detected by the sensor 38. This read value is then stored in the microprocessor's memory for later use.

After determining the length of a mark 37, the microprocessor 74 proceeds from block 514 to a block 516 to determine whether the measured length of the mark 37 is within a specified range. The upper limit of this specified range represents the maximum length of a black mark whereas the lower limit of the range is between 50% and 70% of the maximum length. If the length of the mark measured at block 514 is not within parameters, i.e. the specified range, the microprocessor 74 returns to block 502 to attempt to measure the length of a subsequent mark. This process is repeated, for example two more times, to determine whether a length of a mark can be measured that is within the range specified at block 516. If the measured length of a mark 37 is within the specified range, the microprocessor proceeds to block 518 from block 516.

At block 518, the microprocessor 74 adjusts a trailing edge timer which may be a software timer or the like. More particularly, the trailing edge timer TE is set equal to D1+(Max–l)/2, where D1 represents a default value, Max represents the maximum length of a mark and l represents the actual or measured length of a mark read and stored at block 514. The default value D1 and the value Max are predetermined values that are stored in the microprocessor's memory. The default value D1 is selected based on the value of Max and represents the time between the detection of a trailing edge of a mark 37 having the maximum length, Max, and the desired top of form position for a motor accelerating and advancing at a particular speed. As noted above, the top of form position is the position on a label at which printing may begin. After adjusting the trailing edge timer at block 518, the microprocessor 74 proceeds to block 520 to adjust the leading edge timer LE. More particularly, at block 520 the time of the leading edge timer, LE is set equal to D2–(Max–l)/2. The default value D2 which is adjusted by the compensation factor (Max–l)/2 is also selected based on the value of Max. In particular, the default D2 represents the time from the detection of a leading edge of a mark 37 having the maximum length, Max, until the motor is instructed to stop so that the movement of the web is stopped with the sensor 38 detecting the mark. The default value D2 may be set for example approximately equal to or with in a small range of Max/2.

After adjusting the default D1 for the trailing edge timer at block 518 and the default D2 for the leading edge timer at block 520, the microprocessor proceeds to block 522. At block 522 it is determined whether the sensor 38 is still detecting the absence of a mark and if so, the microprocessor proceeds to block 524 to determine whether the gross timer has expired indicating a jam condition. Upon sensing the leading edge of a mark by the transition from white to black as detected at block 522, the microprocessor 74 proceeds to block 526 to start the leading edge timer using the value LE determined at block 520 for the length of a mark measured at block 514. When the microprocessor determines at block 528 that the leading edge timer has expired, the microprocessor proceeds to block 530 to cause the motor advancing the web to stop. The motion of the web is thus stopped such that the sensor 38 is still detecting a black mark.

It is noted that, in accordance with the calibration routine depicted in FIGS. 15A–15D, as the difference between the measured length of a mark and the maximum length increases, the adjusted trailing edge timer value TE increases. As discussed below, this results in a greater delay from the trailing edge of a mark to the top of form position to compensate for a mark that is smaller than the maximum length so that top 0f form is located at the same position on labels carried by webs having indices of different sizes within the predetermined range set at block 516. Further, the greater the difference between the measured length of a mark and the maximum length, the smaller the increment of advancement of the web from the leading edge of the mark until the motor is instructed to stop. The compensation of the leading edge default value LE insures that the web is stopped with the sensor detecting the presence of the mark.

During a print operation as illustrated in FIGS. 16A–16D, the microprocessor 74 first starts the motor 540 to advance the web through the printer. Thereafter, at block 542, the processor starts a printer timer that is a gross timer used for jam detection. Thereafter, the microprocessor proceeds to block 544 to determine whether the sensor 38 is still detecting the presence of the mark and if so, the microprocessor 74 determines at block 546 whether the print timer started at block 542 has expired or not. If the print timer has expired, the microprocessor proceeds from block 546 to block 507 as discussed above. If the trailing edge of the mark is detected before the expiration of the print timer, the microprocessor proceeds from block 544 to block 548. At block 548 the microprocessor starts the trailing edge timer utilizing the value TE calculated at block 518. The microprocessor waits at block 548 until the expiration of the time TE indicating that the print head is aligned with the top of form position of the next label to be printed on. Thereafter the microprocessor at block 550 moves the data to be printed on the label to the print head. If the line of data moved to the print head at block 550 is not the last line of data to be printed on the label, the microprocessor proceeds to block 554 to determine whether a subsequent mark 37 has been detected yet. If not, the microprocessor proceeds back to block 550 to move the next line of data to the print head. If the microprocessor 74 determines that the sensor 38 has detected the leading edge of a mark 37, at block 554, the processor proceeds to block 556 to start the leading edge timer utilizing the value LE determined at block 520, thereafter returning to block 550. When the microprocessor determines at block 552 that the last line of data to be printed has been applied to the print head, the microprocessor proceeds to block 558. At block 558 the microprocessor 74 determines whether the leading edge timer was set at block 556 and if so, proceeds to block 560 to determine whether the timer has expired. If the timer has expired, the processor proceeds to block 507 to turn off the motor and store an error indication. If the leading edge timer has not expired, the microprocessor proceeds to block 568. If the processor determines at block 558 that the leading edge timer was not set at block 556, it proceeds to block 562 to determine whether the leading edge of a mark has been detected. If not, the microprocessor proceeds to block 564 to determine whether the gross timer, the print timer has expired indicating a jammed condition. If not, the microprocessor proceeds to block 562 to check for the leading edge of a mark 37. When the leading edge of the mark 37 is detected at block 562 by the sensor 38 detecting the presence of a mark, the microprocessor proceeds from block 562 to block 566. At block 566 the microprocessor starts the leading edge timer utilizing the value LE determined at block 520. Thereafter, the microprocessor proceeds to block 568 to wait for the leading edge timer to expire. When the leading edge timer expires, the microprocessor 74 proceeds to block 570 to turn the motor off and to store a status indication representing a good print operation.

Obviously, many modifications and variations of the present invention are possible in light of the above-teachings. Thus, it is to be understood that, within the scope of the appended claims, the invention may be practiced otherwise than as specifically described above.

What is claimed and desired to be secured by Letters Patent of the United States is:

We claim:

1. A printer for printing on a web of record members, said web having a plurality of detectable indices disposed along a length of the web, each of said indices having a measurable length that is equal to or less than a predetermined value, said measurable length extending along a longitudinal axis of said web, said printer comprising:

means for advancing said web through said printer;

means for detecting an index as said web is being advanced;

means responsive to said detecting means for determining the length of said index;

means for storing a default increment of advance value that is less than said predetermined value;

means for adjusting said default value based upon said determined length of said index to provide an adjusted value; and means for controlling said advancing means to advance said web an increment following the detection of a subsequent index, said increment representing said adjusted value and being less than said determined length.

2. A printer for printing on a web of record members, said web having a plurality of detectable indices disposed along a length of said web, each of said indices having a measurable length that is equal to or less than a predetermined maximum length, said measurable length extending along a longitudinal axis of said web and defined by a leading edge and a trailing edge of the index, said printer comprising:

means for advancing said web through said printer;

means for detecting a leading edge or a trailing edge of an index;

means responsive to said detecting means for determining the length of said index;

means for storing a default value that is less than said maximum length;

means for determining a difference between said determined length and said maximum length to adjust said default value; and means for controlling said advancing means to advance the web an increment following the detected leading edge of a subsequent index, said increment being based upon said adjusted default value and being less than said determined length.

3. A printer for printing on a web of record members as recited in claim 2 further including means for determining a top of form position on said record members relative to a detected trailing edge of an index and based upon said difference between said determined length and said maximum length.

4. A printer for printing on a web of record members, said web having a plurality of detectable indices disposed along a length of said web, each of said indices having a measurable length that is equal to or less than a predetermined maximum length, said measurable length extending along a longitudinal axis of said web, said printer comprising:

means for advancing said web through said printer;

means for detecting a presence or absence of an index;

means responsive to said detecting means for determining the length of said index;

means for determining a difference between said determined length and said maximum length to provide a compensation value; and means for controlling said advancing means to advance the web an increment following the detected presence of a subsequent index, said increment decreasing as said compensation value increases.

5. A printer as recited in claim 4 wherein said control means controls said advancing means to advance the web another increment to a top of form position following the detected absence of an index, said other increment decreasing as said compensation value increases.

6. A printer for printing on a web of record members, said web having a plurality of detectable indices disposed along a length of said web, each of said indices having a measurable length that is equal to or less than a predetermined maximum length, said measurable length extending along a longitudinal axis of said web, said printer comprising:

a print head for printing on a record member;

means for advancing said web through said printer;

means for detecting a presence or absence of an means responsive to said detecting means for determining the length of said index;

means for determining a difference between said determined length and said maximum length to provide a compensation value; and means for controlling said advancing means to advance the web after printing by a first increment to a stopped position within said index following the detected presence of an index, said first increment decreasing as said compensation value increases and said controlling means controlling said advancing means to advance from said stop position by a second increment to a top of form position at which printing may begin following the detected absence of an index, said second increment increasing as said compensation value increases.

7. A printer for printing on a web of record members, said web having a plurality of detectable indices disposed along a length of said web, each of said indices having a measurable length that is equal to or less than a predetermined maximum length, said measurable length extending along a longitudinal axis of said web, said printer comprising:

means for advancing said web through said printer;

means for detecting a presence or absence of an index;

means responsive to said detecting means for determining the length of said index;

means for or determining a difference between said determined length and said maximum length to provide a compensation value; and means for controlling said advancing means to advance the web by an increment from a stop position, with said detecting means detecting the presence of said index, to a top of form position at which printing may begin following the detected absence of said index, said increment increasing as said compensation value increases.

8. A method of printing on a web of record members with a printhead, said web having a plurality of detectable indices disposed along a length of said web, each of said indices having a measurable length what is equal to or less than a predetermined value, said measurable length extending alone a longitudinal axis of said web, said method comprising the steps of:

advancing said web past said printhead;

detecting an index as said web is being advanced;

determining the length of said index;

storing a default increment of advance value than is lees than said predetermined value;

adjusting said default value based upon said determined length of said index to provide an adjusted value; and advancing said web an increment following the detection of a subsequent index, said increment representing said adjusted value and being less than said determined length of said index.

9. A method of printing on a web of record members with a printhead, said web having a plurality of detectable indices disposed along a length of said web, each of said indices having a measurable length than is equal to or less than a predetermined maximum length, said measurable length extending along a longitudinal axis of said web and defined by a leading edge and a trailing edge of the index, said method comprising the step of:

advancing said web past said printhead;

detecting a leading edge and a trailing edge of an index;

determining the length of said index;

storing a default value that is less than said maximum length;

determining a difference between said determined length and said maximum length to adjust said default value; and advancing the web an increment following the detected leading edge of a subsequent index, said increment being based upon said adjusted default value and being less than said determined length of said index.

10. A method of printing on a web of record members as recited in claim 9 further including the step of determining a top of form position on said record members relative to a detected trailing edge of an index and based upon said difference between said determined length and said maximum length.

11. A method of printing on a web of record members with a printhead, said web having a plurality of detectable indices disposed along a length of said web, each of said indices having a measurable length that is equal to or less than a predetermined maximum length, said measurable length extending along a longitudinal axis of said web and defined by a leading edge and trailing edge, said method comprising the steps of:

advancing said web past said printhead;

detecting the leading edge and trailing edge of an index;

determining the length of said index;

determining a difference between said determined length and said maximum length to provide a compensation value; and advancing the web an increment following the detected leading edge of an index, said increment decreasing as said compensation value increases.

12. A method of printing as recited in claim 11 including the step of advancing the web another increment to a top of form position following the detected trailing edge of an index, said other increment decreasing as said compensation value increases.

13. A method of printing on a web of record members with a printhead, said web having a plurality of detectable indices disposed along a length of said web, each of said indices having a measurable length that is equal to or less than a predetermined maximum length, said measurable length extending along a longitudinal axis of said web and defined by a leading edge and a trailing edge, said method comprising the steps of:

advancing said web past said printhead;

detecting the leading edge and trailing edge of an index;

determining the length of said index;

determining a difference between said determined length and said maximum length to provide a compensation value; and advancing the web by an increment from a stop position, to a top of form position at which printing may being following the detected trailing edge of a subsequent index, said increment increasing as said compensation value increases.

14. A web for use in a printer having an advancing mechanism for advancing a web and a detector for detecting a presence or an absent of an index, said web comprising a plurality of printable record members disposed along a length of said web and a plurality of detectable indices disposed along a length of said web in a predetermined spatial relationship with respect to said record members, a distance between successive indices being representative of the length of the record members, said web being advanceable by the advancing mechanism within the printer, the presence or absence of each of said indices being detectable by the detector within the printer and the length of at least one of said indices or index being measurable upon detection of the presence and the absence of said at least one of said indices or index and useable to control the advancing mechanism to advance the web a predetermined increment following the detection of the presence of the index wherein the increment is less than the length of the index and approximately equal to one half of the length of the index plus a constant.

* * * * *